July 30, 1968  W. E. SMITH ET AL  3,394,769

AIR CONDITIONING

Filed Oct. 6, 1965

INVENTORS
WILLIAM E. SMITH
ROBERT W. WATERFILL
ROBERT M. WARREN, JR.
BY
ATTORNEYS

United States Patent Office 3,394,769
Patented July 30, 1968

3,394,769
AIR CONDITIONING
William E. Smith and Robert W. Waterfill, Charlotte, N.C., and Robert M. Warren, Jr., Lincroft, N.J., assignors to Buensod-Stacey Corporation, New York, N.Y., a corporation of Ohio
Filed Oct. 6, 1965, Ser. No. 493,506
5 Claims. (Cl. 137—512.1)

ABSTRACT OF THE DISCLOSURE

A volume control regulator for air conditioning systems, the regulator having flexible curtain means, there being a disc rotatable upon movement of the curtain means and a surface adjacent thereto for frictionally contacting said disc for inhibiting harmonic vibrations.

---

Figure 1:
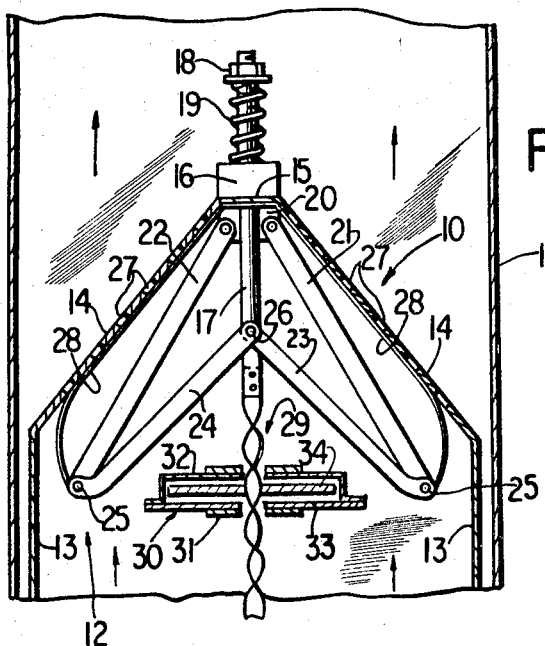

This invention relates to flow control devices for air conditioning systems and particularly to an improved volume regulator for such systems.

Volume regulators for air conditioning systems are old. Certain of these devices employ housings having a perforated top against which flexible curtain means is adapted to be moved in response to variations in upstream pressure and velocity of air. These devices often employ a system of linkages including a reciprocable rod that extends through the top of the housing and is provided with spring means normally urging it in a direction withdrawing the flexible curtain means from the perforated top. Adjustable linkage means is usually employed to preset the degree of closure of the perforated top by the curtain means in order to provide an optimum air flow through the regulator. This linkage preferably is designed to move with a minimum of friction, and consequently has a tendency to vibrate or flutter when sudden changes in the pressure and velocity of supply air occur. Such vibrations of the linkage cause objectionable noises that are transmitted into the zone or rooms being conditioned.

The principal object of this invention is to provide a volume regulator of the above general description including means for dampening and thereby preventing vibration of the linkage when sudden changes in upstream air pressure or velocity occur.

Another object of the invention is to provide such a regulator in which the vibration dampening means employs a friction means which increases in proportion to the velocity of the moving linkage.

Still another object of the invention is to provide such a volume regulator including vibration dampening means that will inhibit harmonic vibrations or oscillations of the linkage as a function of the elasticity of the mechanism and/or the system to which the mechanism might be attached.

A still further object of the invention is to provide such a volume regulator that will be simple in construction and capable of being mounted within duct work without in any way detracting from its normal functioning.

In one aspect of the invention, an air conditioning system may comprise a duct leading to a room or zone being conditioned. A housing may be provided within the duct. It may substantially fill the duct transversely and it may include inclined perforated walls forming a top. A reciprocable rod may be mounted in the housing, extending through its top, and it may be parallel with the duct in which the volume regulator is mounted. The reciprocable rod may be biased in a downstream direction by a spring and an adjustable nut arrangement.

In another aspect of the invention, a toggle linkage means may be provided within the housing, and it may include links fixed to a block attached to, and forming the crown of the top of the housing. The free ends of these links may be connected to flexible curtain means, the opposite end of which curtain means may be fixed to the crown of the housing adjacent the point where the reciprocable rod extends therethrough.

In still another aspect of the invention, other links may be provided, the one ends of which may be connected to the free ends of the first-mentioned links, and the opposite ends of the second links may be pivotally connected to the reciprocable rod at a point below the top of the housing. The construction is such that the adjustable spring means normally urges the reciprocable rod downstream, tending to collapse the linkage within the housing and thereby withdraw the flexible curtain means from the perforated, inclined walls forming the top of the housing.

In a further aspect of the invention, the lower end of the reciprocable rod within the housing may have connected to it a twisted strip which might be described as a threaded member of coarse pitch. The twisted or threaded member may extend through a passage within bracket means that extends between opposed walls of the regulator housing.

In a still further aspect of the invention, an enclosure may be fixed to the bracket means and may encase a disk that is threaded onto the twisted or threaded member. The construction is such that the sides of the disk are closely spaced to the opposing walls of the enclosure.

With the linkage adjusted by the spring and nut means to provide an optimum passage of conditioned air through the perforated top of the regulator housing, sudden variations in the upstream pressure or velocity of the air being supplied to the regulator will cause movement of the vertically reciprocable rod to vary the degree of coverage of the perforated top of the regulator by the flexible curtain means. This will cause the threaded portion of the reciprocable rod to move with it and consequently cause the disk to be rotated and moved against one of the walls of its enclosure, thereby creating a friction tending to resist the movement of the reciprocable member and thereby preventing the development of vibrations in the linkage.

In another aspect of the invention, the enclosure for the rotatable disk may be fixed to the reciprocable rod, and the twisted or threaded member may be fixed to a bracket extending between opposite walls of the regulator housing. In this construction, vertical reciprocation of the rod causes the enclosure for the disk to move with it and thereby causes the disk to be rotated and forced against the outer walls of the enclosure by virtue of its cooperation with the threaded or twisted member.

The above, other objects and novel features of the invention will become apparent from the following specification and accompanying drawing which are merely exemplary.

Figure 3:
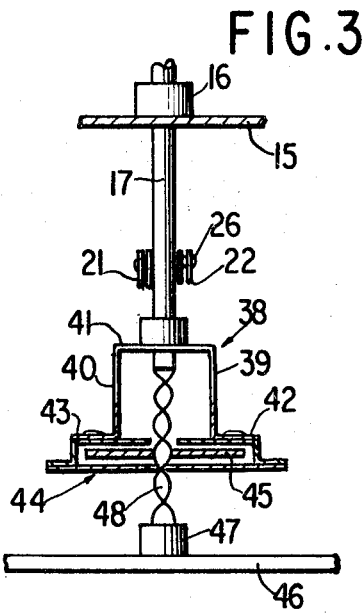
Figure 2:
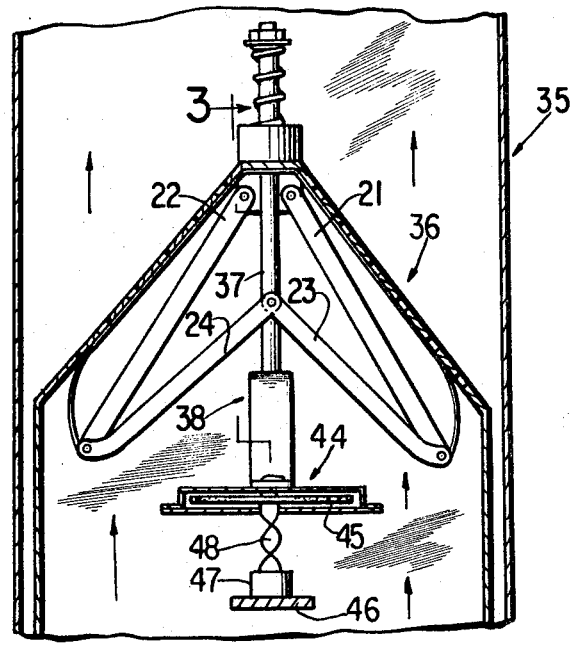
Figure 4:
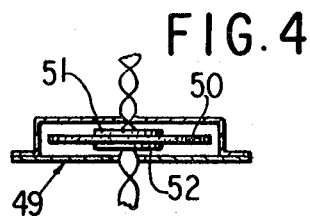

In the drawing:
FIG. 1 is an elevational view of a duct leading to a room or zone to be condtioned, and in which duct is located a volume regulator to which the principles of the present invention have been applied;
FIG. 2 is a view similar to FIG. 1, disclosing a modified form of the invention;
FIG. 3 is a sectional elevational view taken substantially along line 3—3 of FIG. 2; and
FIG. 4 is a sectional view of a modified form of the invention.

Referring to the drawing, and particularly to FIG. 1, the principles of the invention are shown as applied to a volume regulator 10 mounted within a duct 11 leading to a zone or room to be air conditioned. Regulator 10 may comprise a housing 12 including side walls 13 parallel with the side walls of the duct 11. Inclined walls 14 may extend from the upper extremity of the walls 13 and be joined by a crown 15.

The crown 15 may support a block 16 exteriorly of housing 12, having a transverse opening therethrough adapted slidingly to receive a reciprocable rod 17. Rod 17 may extend from a point outside the housing 12 where it is threaded and supports an adjusting nut 18. A compression spring 19 is located between the nut 18 and the top of the block 16 for a purpose to be described later. Another block 20 within the housing 12 may have pivotally connected to it oppositely disposed links 21 and 22, the free ends of which are pivotally connected to other links 23 and 24 by pins 25. The ends of links 23 and 24 opposite those connected to links 21 and 22 are pivotally joined to the rod 17 by a pivot pin 26.

The inclined walls 14 of the housing 12 are provided with apertures 27 through which air from a supply line or duct is adapted to pass. Flexible curtain means 28 may have their one ends anchored between the block 20 and the crown 15 within the housing 12 and their opposite ends connected to the pivot pins 25 which join the links 21, 22, 23 and 24.

The construction is such that the adjusting nut 18 is threaded on the upper end of the rod 17 to a point where it moves the rod 17 upwardly, collapsing the linkages 21, 22, 23, 24 to provide a predetermined maximum air flow through the apertures 27. The nut 18, of course, may be adjusted to provide any predetermined volume of air flowing through the regulator 10, and sudden upstream increase in the velocity and/or pressure of the supply air will cause the curtain to billow against the inclined walls 14, thereby reducing the number of apertures 27 through which the air passes.

Sudden changes in the pressure and/or the velocity of the supply air cause rapid movement of the linkages 21, 22, 23, 24, often producing fluttering of the curtain means 28 as well as undesirable noises which are transmitted through the duct 11. In order to overcome these objectionable features, means is provided for dampening the reciprocable movement of the rod 17, and in the present instance, it takes the form of an extension 29 connected to the end of rod 17 within housing 12. The extension 29 is shown in the form of a twisted strip or what also might be termed a member provided with a very coarse pitched thread. The extension 29 may extend downwardly through an enclosure 30 that is rigidly supported on bracket means 31 extending between walls of housing 12 opposite walls 13 thereof.

Enclosure 30 may comprise parallel spaced walls 32 and 33 between which may be located a disk 34 having a thread located centrally thereof that mates with, and is adapted to receive, the threaded extension 29. Vertical reciprocation of rod 17 causes rotation and movement of disk 34 into contact with either the wall 32 or 33 of enclosure 30. This action resists the vertical movement of rod 17 and therefore provides effective dampening, thus inhibiting vibrations of linkages 21, 22, 23 and 24, and reducing or preventing harmonic vibrations or oscillations thereof.

Referring to FIG. 2, the principles of the invention are shown as applied to a modified form of the invention comprising a duct 35 within which is mounted a volume regulator 36 substantially identical with that shown in FIG. 1. In the embodiment disclosed in FIG. 2, the reciprocable rod 37 has a bracket 38 integrally connected thereto. Referring to FIG. 3, the bracket 38 includes two legs 39 and 40 joined by a cross member 41. Legs 39 and 40 include feet 42 and 43 that are rigidly attached to an enclosure 44. The enclosure 44 is substantially the same as enclosure 30 of FIG. 1 and has located between its upper and lower walls a disk 45. A crossbar 46 extending between opposite walls of the regulator 36 may fixedly support a boss 47 from which extends upwardly a twisted or coarse pitched threaded member 48.

Referring to FIG. 4, the enclosure 49 which may be employed either for enclosure 44 of FIG. 3 or for enclosure 30 of FIG. 1, is shown as having a disk 50 with washers 51 and 52 on opposite faces thereof. This arrangement tends to reduce any binding action between disk 50 and the opposed walls of the enclosure 49 during the actuation of the apparatus.

Although the various features of the improved volume regulator and dampening means therefor have been shown and described in detail to fully disclose several embodiments of the invention, it will be evident that changes may be made in such details and certain features may be used without others without departing from the principles of the invention.

What is claimed is:

1. In a volume regulator for an air conditioning system, the combination comprising a duct leading to a room or zone to be conditioned; a housing within said duct having a perforated top through which air under pressure passes from a source of conditioned air; flexible curtain means within said housing and adapted to be moved toward and away from said perforated top by the variations in pressure within said supply duct, thereby to maintain substantially constant the flow of air through said housing regardless of pressure fluctuations on the upstream side of said housing; reciprocable means extending through the top of said housing; linkage means connected to said housing and to said reciprocable means for affecting the movement of said curtain means; and means for inhibiting harmonic vibrations of said linkage means, said inhibiting means including a rotatable disc having surface means, said disc being rotatable by movement of said reciprocable means, and surface means adjacent the surface means of said disc, one of said surface means being stationary relative to the other, said rotatable disc surface means being contactable with said adjacent surface means to produce friction therebetween in proportion to the velocity of movement of said reciprocable means.

2. In a volume regulator for an air conditioning system, the combination comprising a duct leading to a room or zone to be conditioned; a housing within said duct having a perforated top through which air under pressure passes from a source of conditioned air; flexible curtain means within said housing and adapted to be moved toward and away from said perforated top by the variations in pressure within said supply duct, thereby to maintain substantially constant the flow of air through said housing regardless of pressure fluctuations on the upstream side of said housing; reciprocable means within said housing for affecting the movement of said curtain means; an enclosure rigidly mounted within said housing and including relatively closely spaced parallel walls; a rotatable disk mounted within said enclosure; and a twisted strip connected to said reciprocable means and extending through said enclosure and mating with threads within said disk, whereby upon reciprocation of said reciprocable means, said disk is moved into contact with one of said parallel walls and rotated thereby to provide frictional means for dampening the reciprocable movement of said rod.

3. In a volume regulator for an air conditioning system, the combination comprising a duct leading to a room or zone to be conditioned; a housing within said duct having a perforated top through which air under pressure passes from a source of conditioned air; flexible curtain means within said housing and adapted to be moved toward and away from said perforated top by the variations in pressure within said supply duct, thereby to maintain substantially constant the flow of air through said housing regardless of pressure fluctuations on the upstream side of said housing; reciprocable means for affecting the movement of said curtain means; a bracket attached to said reciprocable means; an enclosure fixed to said bracket, said enclosure including parallel relatively closely spaced walls between which a rotatable disk is mounted; a crossbar within said housing fixed to opposed walls thereof; and a stationary twisted strip mounted on said crossbar and extending through said enclosure and mating with thread means in said disk having a pitch equal to that of said twisted strip.

4. In a volume regulator for an air conditioning system, the combination comprising a duct leading to a room or zone to be conditioned; a housing within said duct having a perforated top through which air under pressure passes from a source of conditioned air; flexible curtain means within said housing and adapted to be moved toward and away from said perforated top by the variations in pressure within said supply duct, thereby to maintain substantially constant the flow of air through said housing regardless of pressure fluctuations on the upstream side of said housing; reciprocable means for affecting the movement of said curtain means; and means responsive to the reciprocation of said reciprocable means for rotating a member against a fixed surface to frictionally resist said reciprocable movement, said member being provided with washers on each side thereof thereby to prevent binding of said member when it is rotated.

5. In a volume regulator for an air conditioning system, the combination comprising a duct leading to a room or zone to be conditioned; a housing within said duct having a perforated top through which air under pressure passes from a source of conditioned air; flexible curtain means within said housing and adapted to be moved toward and away from said perforated top by the variations in pressure within said supply duct, thereby to maintain substantially constant the flow of air through said housing regardless of pressure fluctuations on the upstream side of said housing; reciprocable means within said housing for affecting the movement of said curtain means; an enclosure rigidly mounted within said housing and including relatively closely spaced parallel walls; a rotatable disk mounted within said enclosure; and a twisted strip connected to said reciprocable means and extending through said enclosure and mating with threads within said disk, whereby upon reciprocation of said reciprocable means, said disk is rotated and moved into contact with one of said parallel walls thereby to provide frictional means for dampening the reciprocable movement of said rod, said disk being provided with washers on each side thereof thereby to prevent binding of said disk when it is rotated.

References Cited
UNITED STATES PATENTS

| | | | |
|---|---|---|---|
| 1,067,777 | 7/1913 | Arnold | 137—514 |
| 1,079,824 | 11/1913 | Arnold | 137—514 |
| 1,895,863 | 1/1933 | Pollak. | |
| 2,890,716 | 6/1959 | Werder | 137—512.15 |
| 3,053,275 | 9/1962 | Waterfill | 137—512.1 |
| 3,060,960 | 10/1962 | Waterfill | 137—512.1 |
| 3,242,943 | 3/1966 | Waterfill | 137—512.1 |
| 3,292,657 | 12/1966 | Reynolds | 137—512.15 |

WILLIAM F. O'DEA, *Primary Examiner.*

W. H. WRIGHT, *Assistant Examiner.*